US010174763B1

(12) United States Patent
Orosa et al.

(10) Patent No.: US 10,174,763 B1
(45) Date of Patent: Jan. 8, 2019

(54) VARIABLE PITCH FAN FOR GAS TURBINE ENGINE

(71) Applicant: Florida Turbine Technologies, Inc., Jupiter, FL (US)

(72) Inventors: John A Orosa, Palm Beach Gardens, FL (US); Robert A Ress, Jr., Carmel, IN (US)

(73) Assignee: FLORIDA TURBINE TECHNOLOGIES, INC, Jupiter, FL (US)

( * ) Notice: Subject to any disclaimer, the term of this patent is extended or adjusted under 35 U.S.C. 154(b) by 0 days.

(21) Appl. No.: 16/052,951

(22) Filed: Aug. 2, 2018

(51) Int. Cl.
| | | |
|---|---|---|
| *F04D 29/36* | (2006.01) | |
| *F01D 5/02* | (2006.01) | |
| *F02C 3/02* | (2006.01) | |
| *F02K 3/06* | (2006.01) | |
| *F04D 29/32* | (2006.01) | |
| *F04D 29/02* | (2006.01) | |

(52) U.S. Cl.
CPC ........... *F04D 29/362* (2013.01); *F01D 5/022* (2013.01); *F02C 3/02* (2013.01); *F02K 3/06* (2013.01); *F04D 29/023* (2013.01); *F04D 29/326* (2013.01); *F05D 2220/323* (2013.01); *F05D 2220/36* (2013.01); *F05D 2240/12* (2013.01); *F05D 2240/30* (2013.01); *F05D 2260/57* (2013.01); *F05D 2260/74* (2013.01); *F05D 2260/76* (2013.01)

(58) Field of Classification Search
CPC ...... F04D 29/322; F04D 29/323; F04D 29/34; F04D 29/36; F04D 29/326; F04D 29/329; F01D 5/02; F01D 5/022; F02K 3/06
See application file for complete search history.

(56) References Cited

U.S. PATENT DOCUMENTS

| | | | | |
|---|---|---|---|---|
| 2,529,187 | A * | 11/1950 | Ripatte | F25D 23/00 |
| | | | | 62/451 |
| 3,779,556 | A * | 12/1973 | Johmann | A63H 13/04 |
| | | | | 273/243 |
| 3,964,839 | A | 6/1976 | Kusiak | |
| 4,043,121 | A * | 8/1977 | Thomas | F02K 3/075 |
| | | | | 415/78 |
| 4,047,842 | A | 9/1977 | Avena et al. | |
| 4,292,802 | A * | 10/1981 | Snow | F02K 3/075 |
| | | | | 60/204 |
| 4,810,164 | A | 3/1989 | Wright | |
| 4,934,901 | A | 6/1990 | Duchesneau | |
| 4,976,102 | A | 12/1990 | Taylor | |
| 5,205,712 | A | 4/1993 | Hamilton | |
| 5,794,432 | A * | 8/1998 | Dunbar | F01D 17/162 |
| | | | | 60/204 |
| 7,901,178 | B2 * | 3/2011 | Giaimo | F01D 11/001 |
| | | | | 415/160 |

(Continued)

*Primary Examiner* — Craig Kim
(74) *Attorney, Agent, or Firm* — John Ryznic

(57) ABSTRACT

A variable pitch fan assembly for an aero gas turbine engine that includes a row of fixed pitch blades in a core stream flow and a row of variable pitch blades in a bypass stream flow, and where a sync ring with a number of hydraulic actuators within a flow splitter of the fan stage is used to vary a pitch of each of the bypass stream flow blades. Hydraulic fluid lines pass through the shaft and through the fixed pitch fan blades into the hydraulic actuators to move the sync ring and vary a pitch of the variable pitch bypass flow fan blades.

8 Claims, 5 Drawing Sheets

(56) References Cited

U.S. PATENT DOCUMENTS

| | | | |
|---|---|---|---|
| 8,167,553 B2 | 5/2012 | Perkinson et al. | |
| 8,172,530 B2 | 5/2012 | Perkinson | |
| 8,277,182 B2 | 10/2012 | Perkinson | |
| 8,328,500 B2 * | 12/2012 | Colotte | F01D 17/16 415/149.4 |
| 8,985,954 B2 | 3/2015 | Balk et al. | |
| 9,017,038 B2 | 4/2015 | Pelley et al. | |
| 9,200,594 B2 | 12/2015 | Bouiller et al. | |
| 9,284,041 B2 | 3/2016 | Belmonte et al. | |
| 9,695,703 B2 | 7/2017 | Gallet | |

* cited by examiner

VARIABLE PITCH FAN FOR GAS TURBINE ENGINE

CROSS-REFERENCE TO RELATED APPLICATIONS

None.

GOVERNMENT LICENSE RIGHTS

None.

BACKGROUND OF THE INVENTION

Field of the Invention

The present invention relates generally to a gas turbine engine, and more specifically to an aero gas turbine engine with a fan stage.

Description of the Related Art Including Information Disclosed Under 37 CFR 1.97 and 1.98

In an aero gas turbine engine, a gas turbine drives a compressor and a fan to propel an aircraft. One type of aero engine with a fan includes a variable inlet guide vane (IGV) and a variable exit guide vane (EGV) to adjust a fan bypass stream flow and pressure ratio independent of the fan core stream. FIG. 1 shows this type of prior art engine with a power output shaft 11, a variable inlet guide vane having a variable part 12 and a fixed part 13, a shrouded fan blade 15 with an inner shroud 16, a variable exit guide vane with a fixed part 17 and a variable part 18, a core stream flow 19, a bypass stream flow 20, and shrouds 14 and 16 and 9 extending from the vanes or blades to separate the core stream flow 19 from the bypass stream flow 20. The core stream flow 19 and the bypass stream flow 20 are separated by full chord shrouds 14 and 9 in the static vanes and in the rotating blades by shroud 16 as seen in FIG. 1. FIG. 2 shows a cross section top view of the variable inlet guide vane with the fixed part 12 and the variable part 13. FIG. 3 shows the variable exit guide vane with the variable part 17 and the fixed part 18. The dashed lines in FIGS. 2 and 3 represent the movement of the variable parts 13 and 17 of these guide vanes. This design requires extra length for the IGV and extra complexity to achieve variable geometry in the IGV and EGV. Fan bypass performance also suffers at highly closed IGV positions.

BRIEF SUMMARY OF THE INVENTION

An aero gas turbine engine with a fan blade assembly having core stream flow fixed pitch blades and bypass stream flow blades having variable pitch fan blades, where a sync ring is contained in a slow splitter and uses a hydraulic pressure to move the sync ring and vary the pitch of the bypass fan blades. The bypass stream flow variable pitch fan blades have about the same spanwise height as the fixed fan blades in the core stream flow.

Hydraulic fluid lines pass through the shaft and through the fixed pitch fan blades into and out of the hydraulic actuators contained within the flow splitter. Each variable pitch fan blade includes a pivot arm extending from a bottom end that connects to a pivot pin secured to the sync ring for movement.

BRIEF DESCRIPTION OF THE SEVERAL VIEWS OF THE DRAWINGS

FIG. 1 shows a cross section side view of a prior art aero gas turbine engine with variable inlet guide vanes and variable exit guide vanes with a shrouded fan blade in-between.

DETAILED DESCRIPTION OF THE INVENTION

The present invention is a variable pitch fan blade assembly in a bypass stream of an aero gas turbine engine that will improve a low power performance and remove the need for an inlet guide vane or to make the outlet guide vane variable. The part-span variable pitch fan is especially useful for an adaptive aero engine used to power a vertical take-off and landing (VTOL) aircraft where a turbofan is desired for cruise thrust but a turboshaft is desired to drive an electric generator or a horizontal rotor system for vertical take-off and landing. In one embodiment, the design can be enabled by imbedding a hydraulic actuated sync ring in the part span blade shroud to rotate individual fan blades attached to the shroud (in a manner similar to some variable pitch propellers). The bypass flow fan blades can be constructed of light weight composites to reduce the centrifugal load on the shroud and inner blade span.

Figure 3:
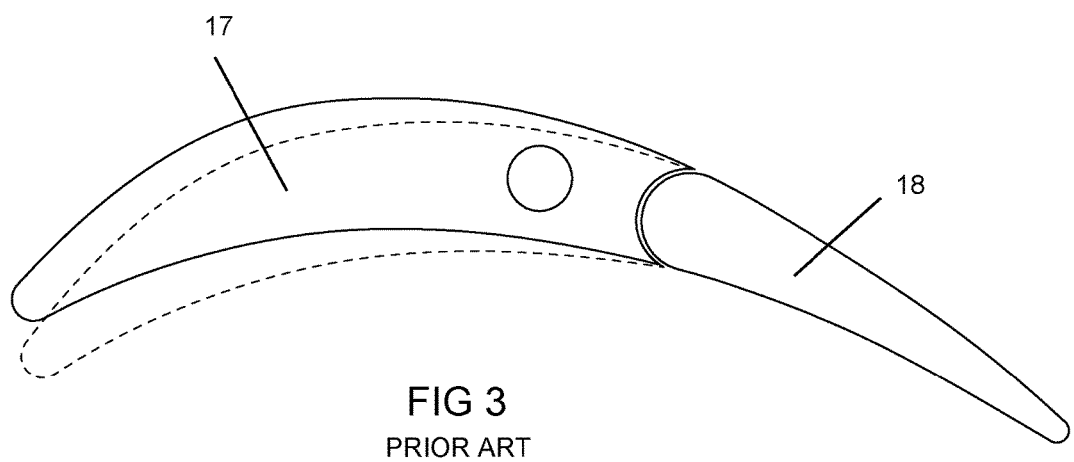
FIG. 3 shows a cross section top variable exit guide vane of the FIG. 1 prior art aero gas turbine engine.

FIG. 3 shows a front view of the variable pitch fan assembly of the present invention and includes a power output shaft 21, a core flow duct 22, a bypass flow duct 23, a fixed pitch blade 24 secured to the power output shaft 21, a variable pitch blade 25 rotatably secured to a sync ring 26, and hydraulic fluid lines 27 and 28 to supply and discharge hydraulic fluid to a hydraulic piston and cylinder assembly for changing the pitch of the variable pitch blades 25. A flow splitter 34 separates the core stream flow 22 from the bypass stream flow 23 and also contains the sync ring 26. The fixed pitch blades 24 and the variable pitch blades 25 have substantially the same spanwise height which can only be done when the bypass stream flow blades can vary in pitch while the fixed pitch blades in the core stream flow are fixed.

Hydraulic fluid lines pass through the shaft 21 and up through the fixed pitch blades 24 in the core stream flow to the hydraulic actuators 31. Since the hydraulic actuators 31 are located between adjacent variable pitch blades 25, each of the fixed pitch blades 24 has one hydraulic line 27 or 28 extending therein. In one embodiment, one hydraulic actuator 31 is used for every two variable pitch fan blades 25.

Figure 2:
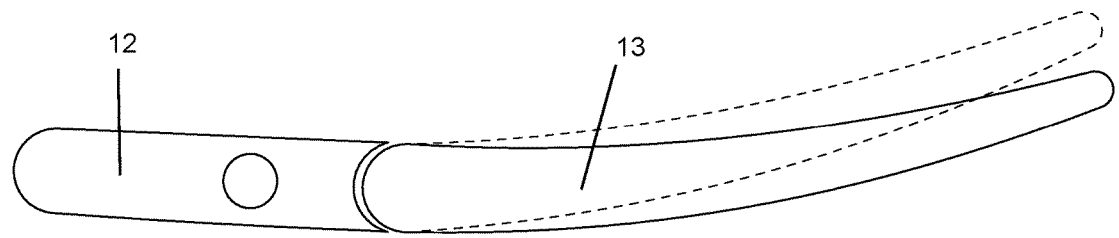
FIG. 2 shows a cross section top variable inlet guide vane of the FIG. 1 prior art aero gas turbine engine.
Figure 5:
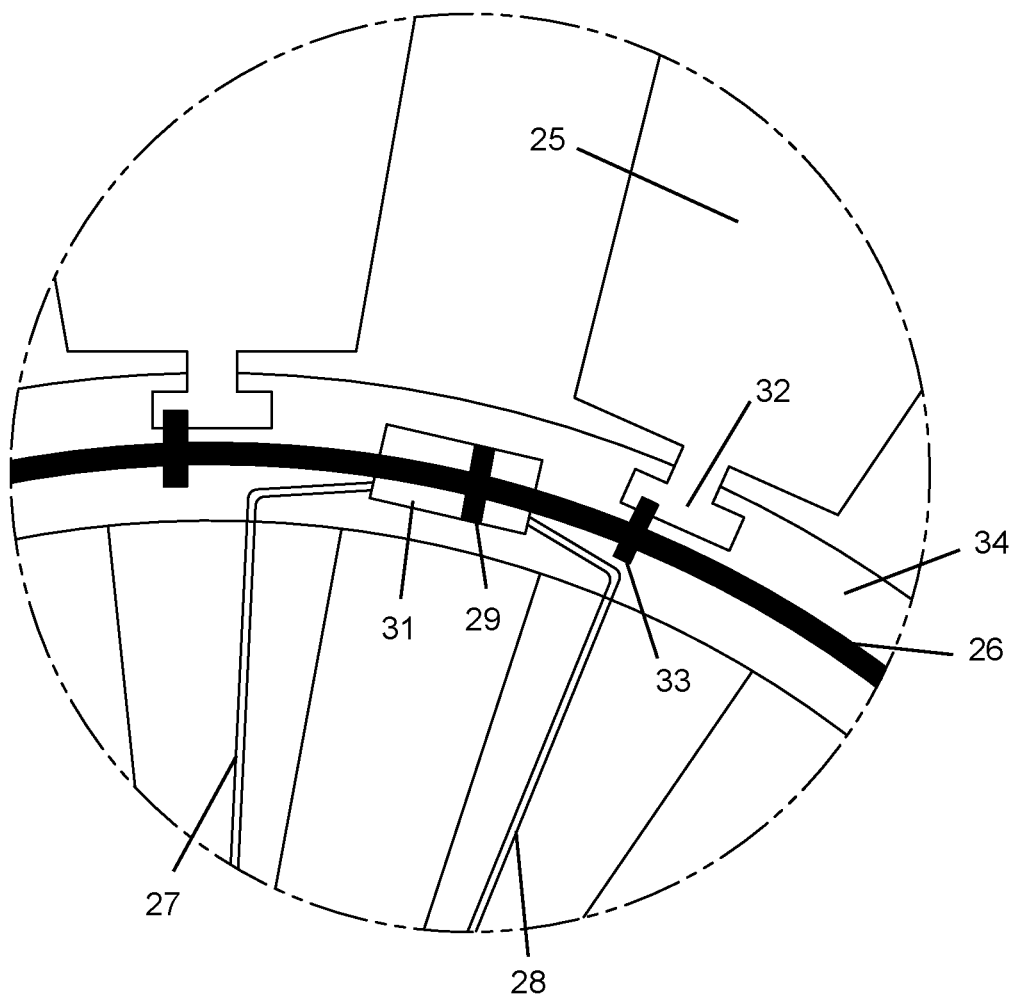
FIG. 5 shows a detailed view of a section of the variable pitch fan of FIG. 4.

FIG. 5 shows a detailed view of a section of FIG. 2. The sync ring 26 is a fully annular shaped ring with a series of pistons 29 attached to move the sync ring under influence of hydraulic pressure acting within a series of hydraulic cylinders 31 attached to the flow splitter or shroud 34. The hydraulic cylinder and the piston are referred to as a hydraulic actuator. Each variable pitch fan blade 25 includes a pivot arm 32 extending from a bottom side of the fan blade that is attached to a pivot pin 33 on the sync ring 26. The pivot pin 33 is external of the hydraulic cylinder 31. To change a pitch of the variable pitch fan blades 25, hydraulic fluid under pressure is supplied to one of the two fluid lines 27 and 28 to force the pistons 29 to move within the hydraulic cylinder 31. As the sync ring 26 moves relative to the flow splitter 34, the pitch of each of the variable pitch fan blades will change while the fixed pitch blades remain at the fixed angle.

Figure 1:
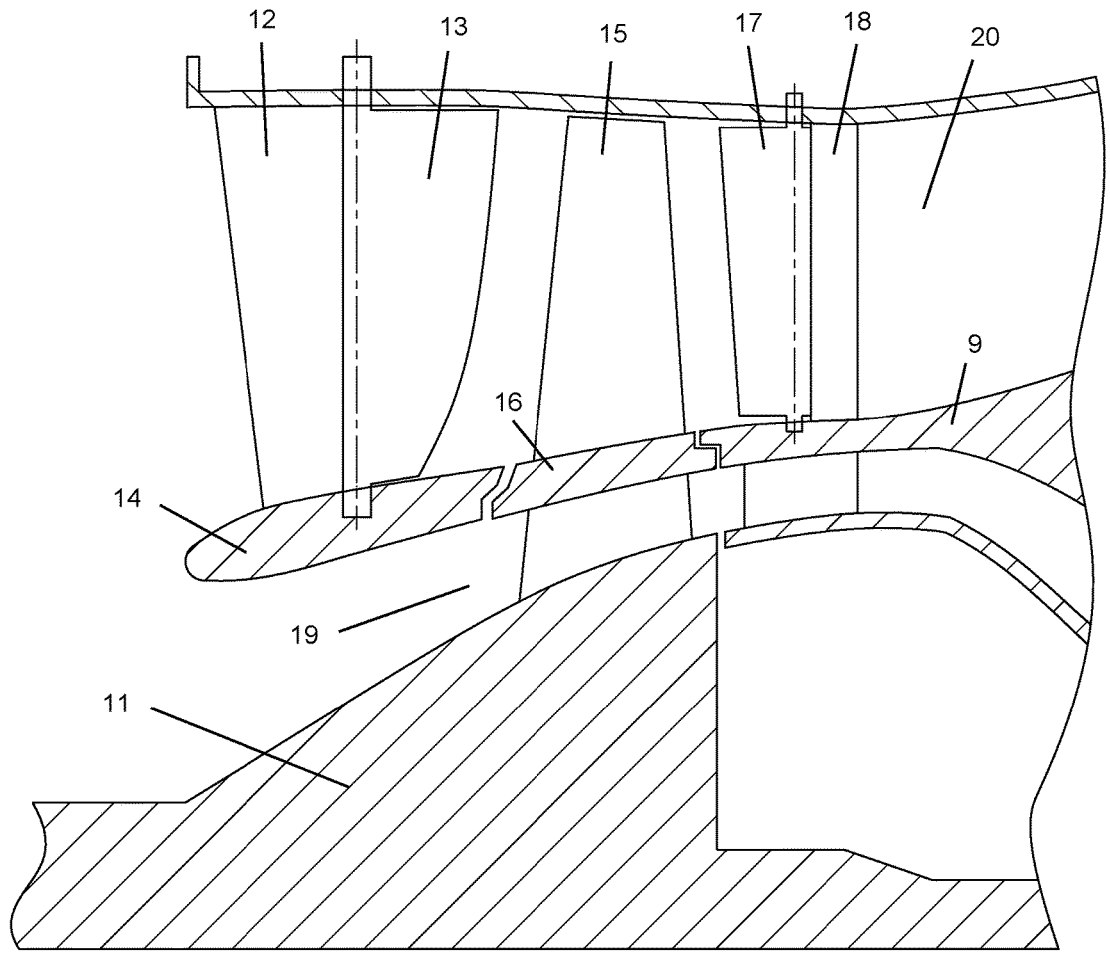
Figure 4:
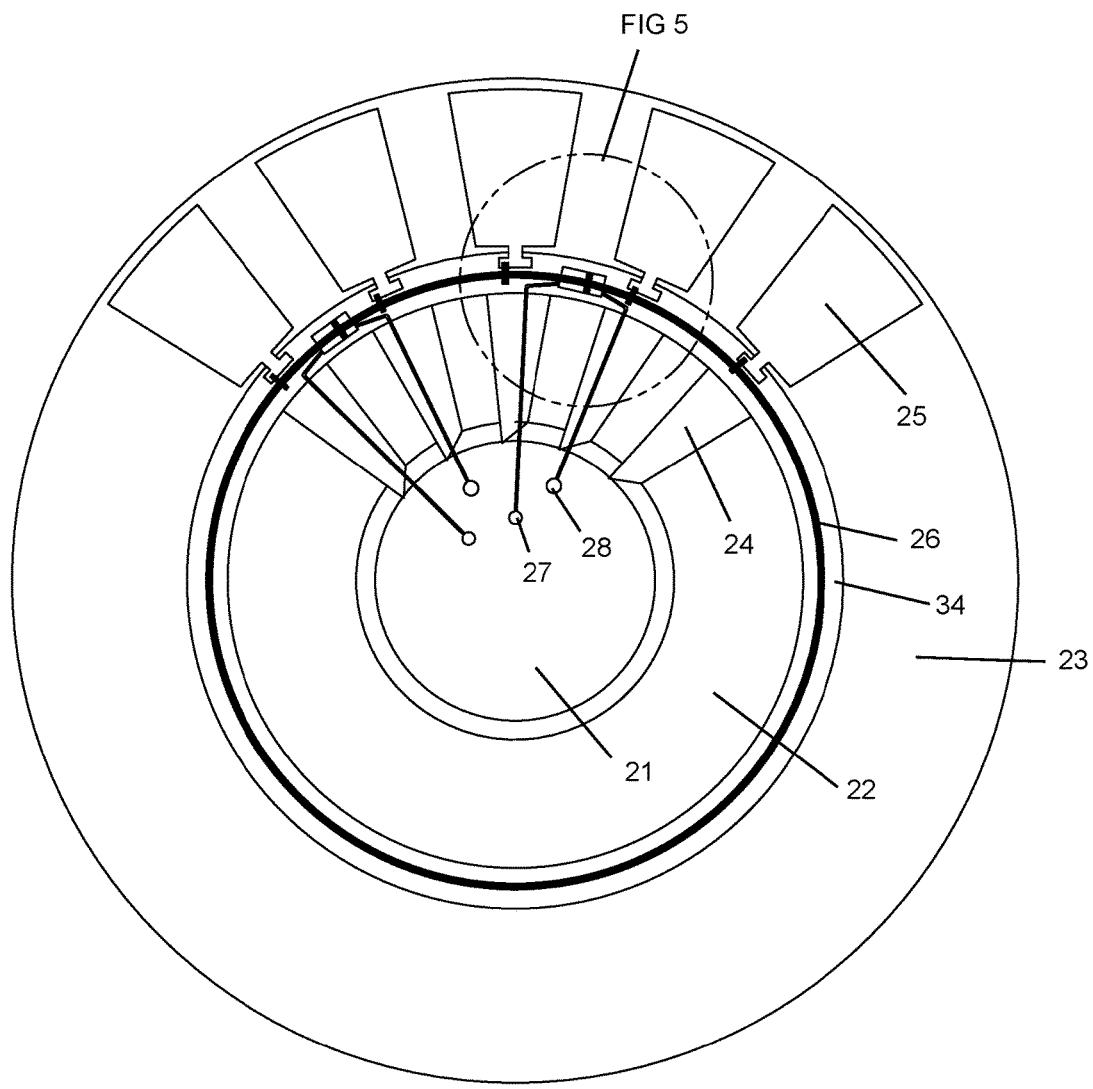
FIG. 4 shows a cross section front view of a variable pitch fan assembly of the present invention.

A comparison of the prior art variable inlet guide vane assembly in an aero gas turbine engine of FIG. 1 with the variable pitch fan assembly of the present invention in FIG. 4 shows a substantial reduction in moveable parts from the prior art FIG. 1 to the present invention of FIG. 4. The FIG. 1 assembly requires variable inlet guide vane and variable exit guide vanes in order to direct the flow of air into the fan blade 15 and then redirect the air flow from the discharge side of the fan blade 15 in the bypass flow stream 20. This is all replaced with the single variable pitch fan 25 in FIG. 6. A single exit guide vane assembly 35, 36 and 37 is used downstream from the variable pitch fan blade 25 to redirect the flow in the bypass flow 20. The core flow stream 19 uses fixed blades 24 and fixed vanes 37 separated from the bypass flow airfoils by the shrouds 34 and 36.

Figure 6:
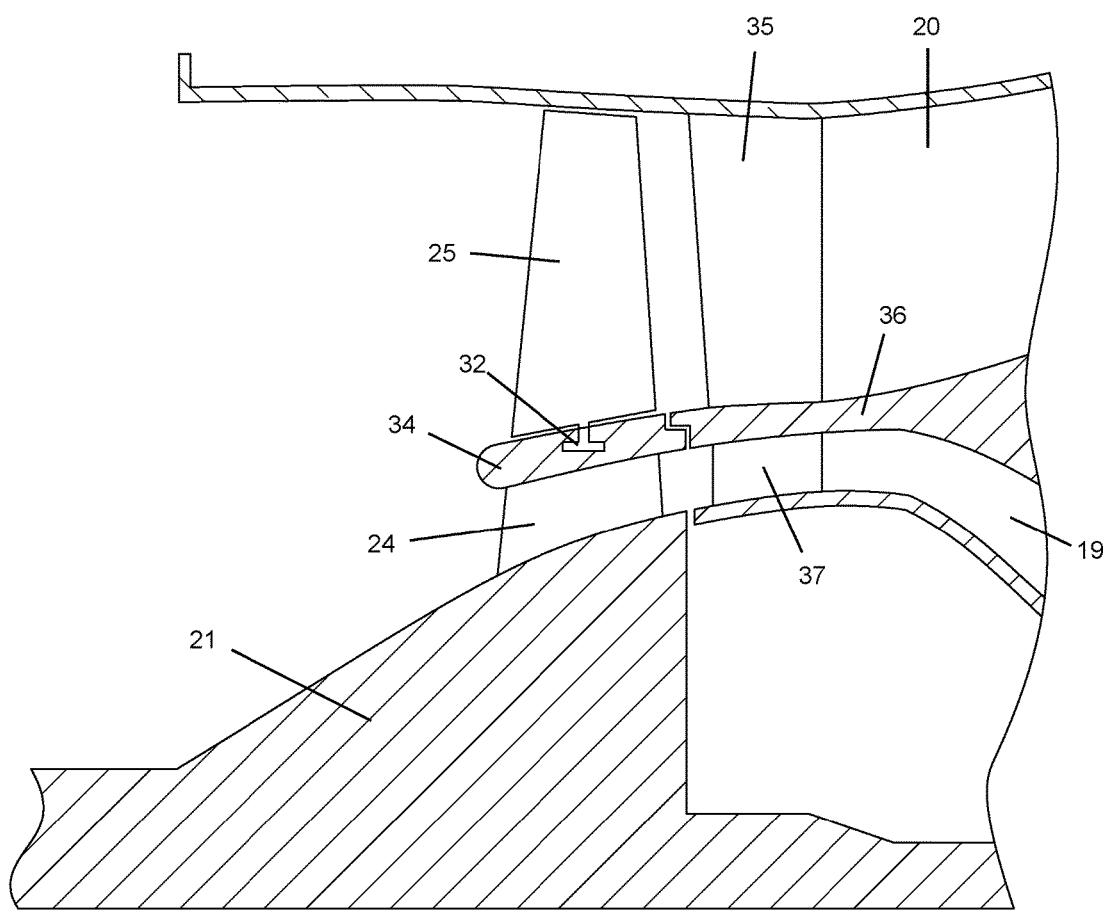
FIG. 6 shows a cross section side view of the variable pitch fan assembly of the present invention.

FIG. 6 shows a cross section side view of the variable pitch fan assembly of FIG. 4. The shaft 21 rotates with the fan that includes the variable pitch airfoil 25 and the fixed pitch airfoil 24 that are both separated by the flow splitter or shroud 34. The pivot arm 32 is shown on the bottom end of the variable pitch fan blade 25 and located within the flow splitter 34. A fixed pitch guide vane assembly with outer vane 35 and inner vane 37 extending from shroud 36 is located downstream in both the core flow 19 and the bypass flow 20 from the variable pitch fan assembly. The core flow 19 enters into a combustor of the gas turbine engine while the bypass flow is discharged from the engine without adding any additional energy.

The embodiment of FIGS. 4-6 disclose the use of a hydraulic actuator that moves the sync ring and this change a pitch of the variable inlet guide vanes. Other embodiments could use an electric or mechanical actuation. The actuators can be located in the sync ring in a location like the hydraulic actuators in the FIG. 4 embodiment. Any control mechanisms for the electric or mechanical actuators can also pass through the shaft and into one or two of the fixed guide vanes 24 located below and adjacent to the actuator in the sync ring 26.

The invention claimed is:

1. An aero gas turbine engine comprising:
a compressor;
a combustor;
a gas turbine;
the compressor produces compressed air for the combustor to burn with a fuel and produce a hot gas stream to drive the gas turbine which drives the compressor;
a fan stage driven by the gas turbine;
the fan stage including a plurality of fixed fan blades, a flow splitter, and a plurality of variable pitch fan blades;
the flow splitter separating a core stream flow from a bypass stream flow;
the flow splitter including a sync ring and at least one actuator connected to each of the plurality of variable pitch fan blades to vary a pitch of the plurality of variable pitch fan blades.

2. The aero gas turbine engine of claim 1, and further comprising:
each of the plurality of variable pitch fan blade includes a pivot arm extending from a bottom side that engages with a pivot pin secured to the sync ring.

3. The aero gas turbine engine of claim 1, and further comprising:
the plurality of variable pitch fan blades are made from a light weight composite material.

4. The aero gas turbine engine of claim 1, and further comprising:
the plurality of fixed pitch blades and the plurality of variable pitch blades have substantially the same spanwise height.

5. The aero gas turbine engine of claim 1, and further comprising: the at least one actuator is a hydraulic actuator.

6. The aero gas turbine engine of claim 5, and further comprising: one hydraulic actuator for every two of the plurality of variable pitch fan blades.

7. The aero gas turbine engine of claim 5, and further comprising:
the hydraulic actuator is located in the flow splitter;
a first hydraulic fluid line extends through a first fixed inlet guide vane; and,
a second hydraulic fluid line extends through a second fixed inlet guide vane.

8. The aero gas turbine engine of claim 1, and further comprising:
the at least one actuator is located in the flow splitter between two adjacent variable inlet guide vanes;
and, a control mechanism for the at least one actuator passes through one or both of a first and a second fixed inlet guide vane.

* * * * *